US011343267B2

(12) United States Patent
Seki et al.

(10) Patent No.: US 11,343,267 B2
(45) Date of Patent: May 24, 2022

(54) THREAT MONITOR, THREAT MONITORING METHOD, AND RECORDING MEDIUM THEREFORE

(71) Applicant: HITACHI SOLUTIONS, LTD., Tokyo (JP)

(72) Inventors: Kota Seki, Tokyo (JP); Kota Ideguchi, Tokyo (JP)

(73) Assignee: HITACHI SOLUTIONS, LTD., Tokyo (JP)

(*) Notice: Subject to any disclaimer, the term of this patent is extended or adjusted under 35 U.S.C. 154(b) by 196 days.

(21) Appl. No.: 16/816,056

(22) Filed: Mar. 11, 2020

(65) Prior Publication Data

US 2021/0044607 A1    Feb. 11, 2021

(30) Foreign Application Priority Data

Aug. 7, 2019 (JP) .............................. JP2019-145274

(51) Int. Cl.
| | |
|---|---|
| *H04L 9/40* | (2022.01) |
| *G06F 21/55* | (2013.01) |
| *H04L 43/04* | (2022.01) |
| *H04L 43/16* | (2022.01) |
| *H04L 41/069* | (2022.01) |
| *H04L 41/147* | (2022.01) |
| *H04L 29/06* | (2006.01) |

(52) U.S. Cl.
CPC ........ *H04L 63/1425* (2013.01); *G06F 21/552* (2013.01); *H04L 43/04* (2013.01); *H04L 63/20* (2013.01)

(58) Field of Classification Search
CPC ... G06F 21/552; H04L 41/069; H04L 41/147; H04L 43/04; H04L 43/16; H04L 63/1425; H04L 63/20
See application file for complete search history.

(56) References Cited

U.S. PATENT DOCUMENTS

| 11,140,179 | B1* | 10/2021 | Infante-Lopez | .... H04L 63/1416 |
| 2017/0013018 | A1* | 1/2017 | Nakata | .................... H04L 63/20 |
| 2018/0174065 | A1* | 6/2018 | Debnath | ............. G06F 11/3476 |

FOREIGN PATENT DOCUMENTS

| CN | 109257326 A | * | 1/2019 |
| WO | 2015-141630 A1 | | 9/2015 |

* cited by examiner

*Primary Examiner* — Alina A Boutah
(74) *Attorney, Agent, or Firm* — Volpe Koenig

(57) ABSTRACT

A monitor for monitoring a monitored object comprises: a processor configured to execute a program; a storage device configured to store the program; and a communication interface capable of communicating with the monitored object, wherein the processor is configured to execute: acquisition processing for acquiring threat information indicating association of a plurality of events necessary for an occurrence of a threat; and determination processing for determining, as a collection scheme of a log from the monitored object according to a rule for detecting an attack on the monitored object, either a passive scheme for collecting the log transmitted from the monitored object or an active scheme for collecting from the monitored object the log requested from the monitor to the monitored object.

11 Claims, 15 Drawing Sheets

RULE DB 320

| THREAT ID 401 | RISK VALUE 402 | RULE ID 403 | LOG COLLECTOR ID 404 | CONTENT OF RULE 405 | IMPORTANCE 406 | DETECTION COST 407 | COLLECTION SCHEME 408 |
|---|---|---|---|---|---|---|---|
| 12 | 7.0 | abc123 | D1,D2,D3 | RECEIVE AUTHENTICATION ERROR IN SAME SOURCE ADDRESS FROM A PLURALITY OF DEVICES | HIGH | 210 | PASSIVE |
| 12 | 7.0 | abc456 | D1,D2,D3 | RECEIVE UNAUTHORIZED DATA ALERT FROM A PLURALITY OF DEVICES IN CERTAIN AREA | LOW | 60 | ACTIVE |
| 13 | 6.5 | xyz111 | D4 | ... | HIGH | 0 | PASSIVE |
| ... | ... | ... | ... | | ... | ... | ... |

THREAT INFORMATION 410

*FIG. 4*

ALERT DB 103

| ALERT ID | TIME OF OCCURRENCE | CONTENT OF ALERT |
|---|---|---|
| abc123 | 12:23:15 | AUTENTICATION ERROR IN SAME SOURCE ADDRESS IS RECEIVED FROM A PLURALITY OF DEVICES |
| abc456 | 12:23:18 | UNAUTHORIZED DATA ALERT IS RECEIVED FROM A PLURALITY OF DEVICES IN CERTAIN AREA |
| ⋮ | ⋮ | ⋮ |

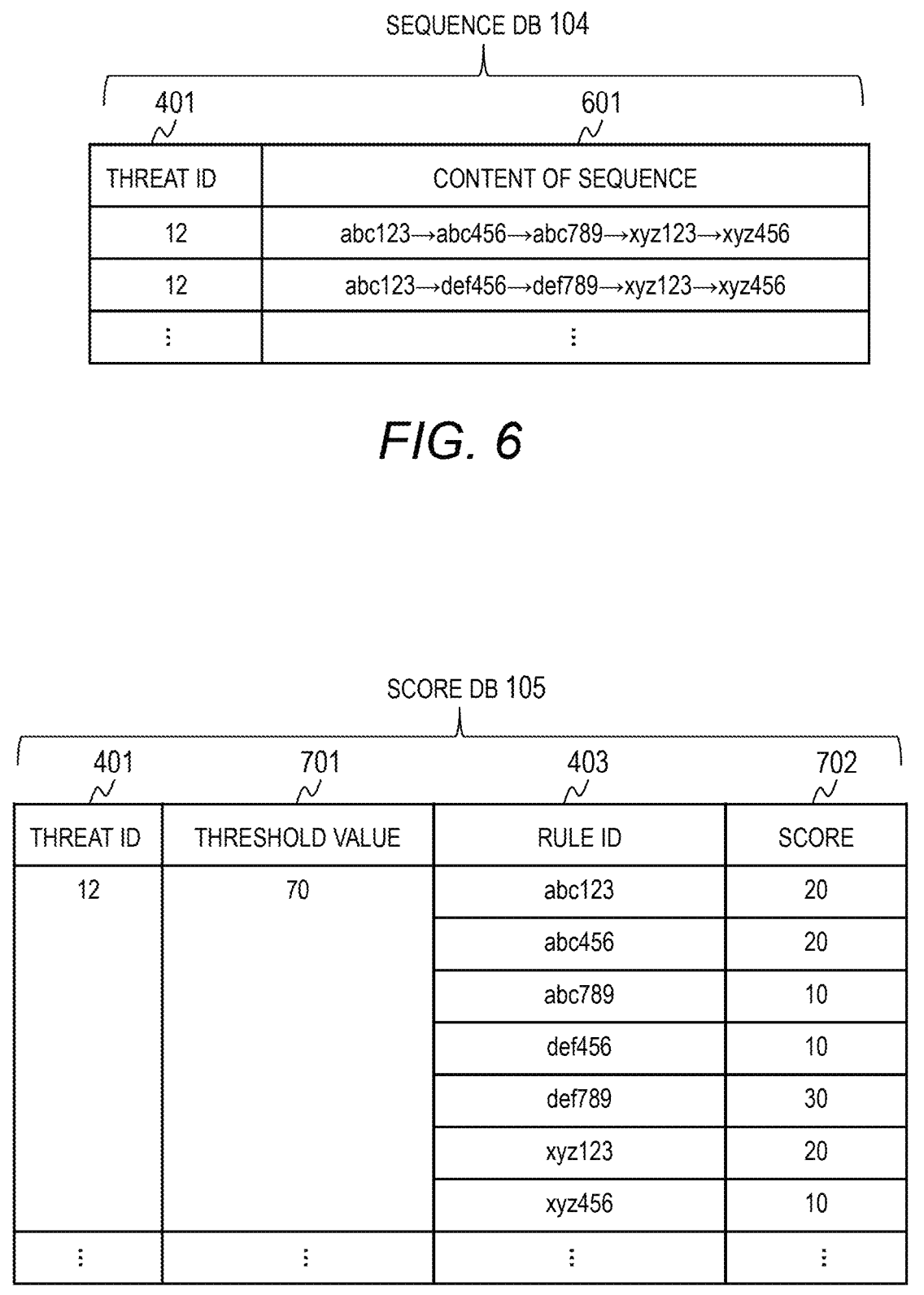

SEQUENCE DB 104

| THREAT ID | CONTENT OF SEQUENCE |
|---|---|
| 12 | abc123→abc456→abc789→xyz123→xyz456 |
| 12 | abc123→def456→def789→xyz123→xyz456 |
| ⋮ | ⋮ |

*FIG. 6*

SCORE DB 105

| THREAT ID | THRESHOLD VALUE | RULE ID | SCORE |
|---|---|---|---|
| 12 | 70 | abc123 | 20 |
| | | abc456 | 20 |
| | | abc789 | 10 |
| | | def456 | 10 |
| | | def789 | 30 |
| | | xyz123 | 20 |
| | | xyz456 | 10 |
| ⋮ | ⋮ | ⋮ | ⋮ |

*FIG. 7*

LOG DB 820

| TIME STAMP | LOG DETAIL INFORMATION |
|---|---|
| 2017/08/01 12:20:26.158 | rupdata 123.456.789.123 |
| 2017/08/01 12:20:47864 | autoexnt upfile |
| ⋮ | ⋮ |

THREAT MONITOR, THREAT MONITORING METHOD, AND RECORDING MEDIUM THEREFORE

CLAIM OF PRIORITY

The present application claims priority from Japanese patent application JP 2019-145274 filed on Aug. 7, 2019, the content of which is hereby incorporated by reference into this application.

BACKGROUND

The present invention relates to a monitor that monitors a monitored object, a monitoring method, and a recording medium.

An IoT (Internet of Things) device has a greater opportunity to communicate with an external device, thereby increasing the possibility of being a target of a cyberattack. Even though the IoT device is provided with security measures in advance, it is also assumed that some of cyberattacks conquer the measures to damage the device. A center that monitors the status of the IoT device needs to collect and analyze logs in real time to detect promptly that the IoT device has been attacked.

WO2015/141630 discloses an analysis rule adjuster that adjusts an analysis rule to be used for analysis of a communication log in order to detect unauthorized communication through a network. This analysis rule adjuster is provided with a log acquisition unit, a log analysis unit, and a first analysis unit. The log acquisition unit acquires a communication log through a defended network and a communication log caused by malware. The log analysis unit analyzes the communication log acquired by the log acquisition unit based on predetermined analysis rule and tuning condition. The first analysis unit analyzes an analysis by the log analysis unit to calculate a tuning recommendation value that satisfies the tuning condition which is used for adjustment of the predetermined analysis rule.

However, in the prior art described above, the analysis rule adjuster may collect a log using a mobile communication network, and collects all the logs necessary for the analysis rule so as to likely increase a communication cost.

SUMMARY

An object of the present invention is to reduce a communication cost in collecting a log from a monitored object without impairing detection accuracy of an attack on the monitored object.

An aspect of the invention disclosed in this application is a monitor for monitoring a monitored object, comprising: a processor configured to execute a program; a storage device configured to store the program; and a communication interface capable of communicating with the monitored object, wherein the processor is configured to execute: acquisition processing for acquiring threat information indicating association of a plurality of events necessary for an occurrence of a threat; and determination processing for determining, as a collection scheme of a log from the monitored object according to a rule for detecting an attack on the monitored object, either a passive scheme for collecting the log transmitted from the monitored object or an active scheme for collecting from the monitored object the log requested from the monitor to the monitored object.

According to a typical embodiment of the present invention, it is possible to reduce a communication cost in collecting a log from a monitored object without impairing detection accuracy of an attack. Other objects, configurations, and effects than those described above are clarified by the following description of an embodiment.

BRIEF DESCRIPTION OF THE DRAWINGS

FIG. 4 is an illustrative view showing an example of memory contents of the rule DB.

FIG. 5 is an illustrative view showing an example of memory contents of the alert DB 103.

FIG. 6 is an illustrative view showing an example of memory contents of the sequence DB.

FIG. 7 is an illustrative view showing an example of memory contents of the score DB.

DETAILED DESCRIPTION OF THE EMBODIMENT

Figure 1:
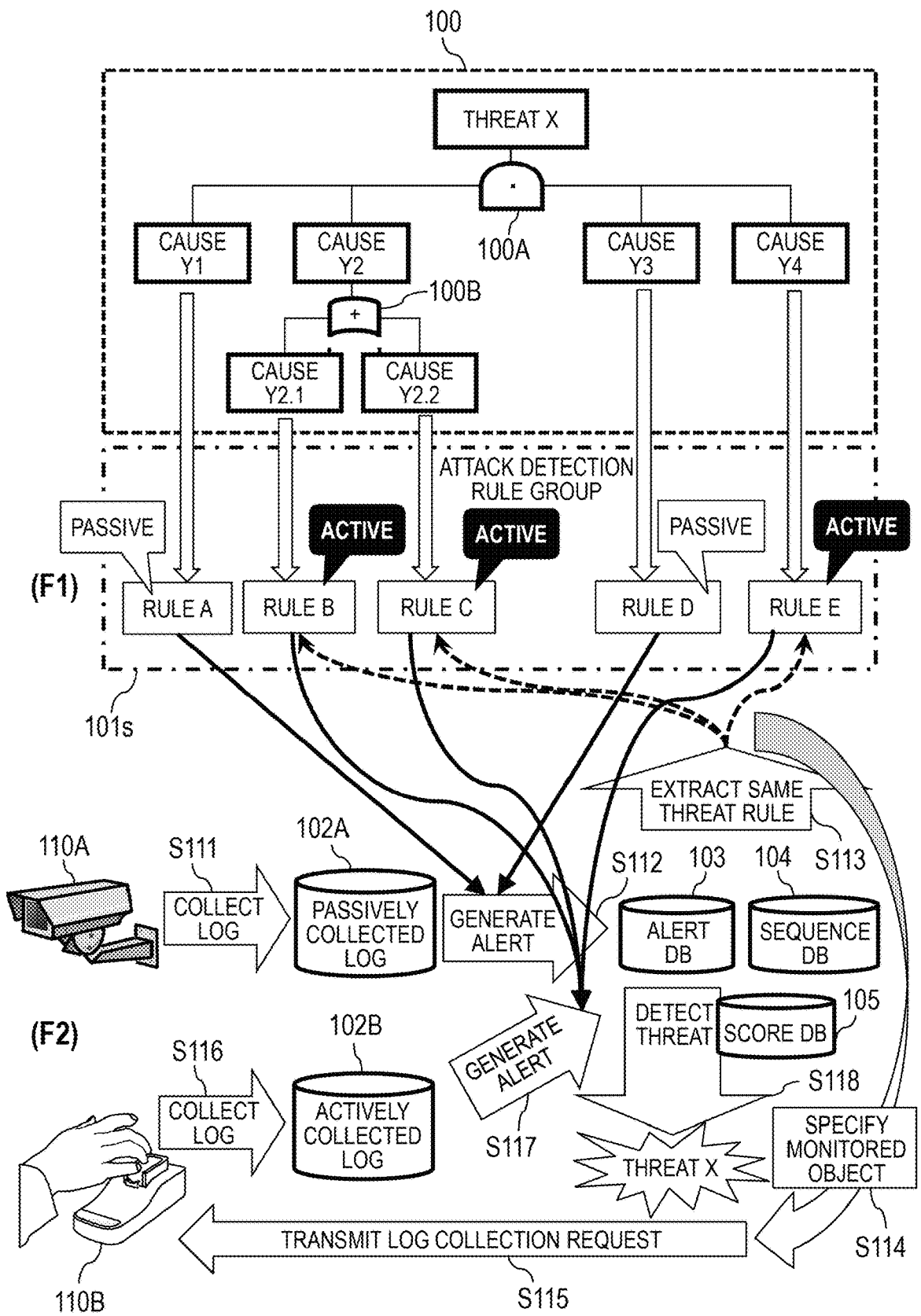
FIG. 1 is an illustrative view showing an example for determination of a log collection scheme and an example of threat detection.

Example for determination of log collection scheme and example of threat detection FIG. 1 is an illustrative view showing an example for determination of a log collection scheme and an example of threat detection. A monitor that monitors a monitored object determines a log collection scheme in a log collection scheme determination phase F1, and then detects a threat to the monitored object (in the present example, an IoT device as an example) on a network in a threat detection phase F2. For this purpose, threat information 100 is prepared.

In the log collection scheme determination phase F1, for the monitored object, an attack detection rule is created from a threat analysis. In the threat analysis, threat that may occur to the monitored object is extracted in light of 5 W (who, why, what, where, and when). Then, FT (Fault Tree) deploying in a tree shape is created as threat information 100 so as to logically analyze what kind of a procedure and condition may cause a threat.

The threat information 100 is a threat analysis that is analyzed by means of a known threat analysis tool, and indicates association among a plurality of events necessary for an occurrence of a threat. Threat is a general term for various kinds of attacks, such as illegal access, tampering, a virus, tapping, interception, and spoofing, to a monitored object on a network. An attack is a threat that is specified with contents of an attack.

In FT analysis, each threat is considered as a top-level event ("threat X" in FIG. 1), and a specific method of implementing (how to implement) an occurrence of the event is deployed. In this case, a logical symbol of product 100A is used in a case where an upper event does not occur without establishing each of the methods of implementing as such, and a logical symbol of sum 100B is used in a case where the upper event occurs in a case where any of the methods is established.

For example, the threat X obtained as the threat information 100 occurs in a case where four events as causes Y1 to Y4 have occurred, and is analyzed as an attack from an attacker. A cause is a malfunction or a failure in a monitored object which is caused by an attack on the monitored object, or an event as an occurrence factor of a trouble. Therefore, a combination of one or more of the causes becomes a threat.

In the log collection scheme determination phase F1, an analyst predicts a behavior taken by an attacker with respect to each basic event, and creates an attack detection rule group 101s that is used for detecting the behavior from a log collected from an IoT device. An attack detection rule is set for each cause. In FIG. 1, by way of example, the attack detection rule group 101s of rules A to E is set.

The rule A is an attack detection rule for specifying an occurrence of a cause Y1 to detect an attack. The rule B is an attack detection rule for specifying an occurrence of a cause Y2.1 to detect an attack. The rule C is an attack detection rule for specifying an occurrence of a cause Y2.2 to detect an attack. The rule D is an attack detection rule for specifying an occurrence of a cause Y3 to detect an attack. The rule E is an attack detection rule for specifying an occurrence of a cause Y4 to detect an attack.

In the log collection scheme determination phase F1, the monitor sets a collection scheme of a log from a monitored object for each attack detection rule. The collection scheme includes two types as a passive scheme and an active scheme. The passive scheme is a scheme in which the monitor passively collects a log from the monitored object, that is, a collection scheme in which the monitor receives and accumulates in the monitor a log transmitted from the monitored object all the time. On the other hand, the active scheme is a collection scheme for collecting a log from the monitored object in a case where the monitor requests the log from the monitored object.

Since a large volume of logs may be collected as there are more attack detection rules in the passive scheme, it is possible to detect all of the attacks, although a large volume of logs are transmitted from the monitored object to the monitor, resulting in increase of traffic, thus increase of a communication cost due to capital investment for alleviating traffic and the like. Further, since a large volume of logs may be restrained from being collected as there are more attack detection rules in the active scheme, it is possible to reduce a communication cost, whereas detection accuracy of an attack is impaired.

Therefore, in the log collection scheme determination phase F1, the monitor determines a collection scheme of a log for each attack detection rule, in consideration of importance in the threat information 100 as an index whether a cause of each attack detection rule easily occurs, a communication cost in a case where a collection scheme of a log is set to the passive scheme in each attack detection rule, and a risk value for evaluating a risk of a threat. As such, reduction in communication cost when collecting a log from the monitored object is achieved without impairing detection accuracy of an attack on the monitored object. In FIG. 1, by way of example, the passive scheme is set to the rule A and the rule D, while the active scheme is set to the rule B, the rule C, and the rule E.

In the threat detection phase F2, the monitor detects an event as a cause of a threat according to an attack detection rule, and detects whether an occurrence of the threat X is predicted, or whether the threat X has already occurred. For example, the monitor collects (step S111) and saves a log as a passively collected log 102A from a monitored object 110A (for example, monitoring camera) applied with the passive scheme. The monitor applies the attack detection rules A and D determined as the passive scheme (hereinafter, passive rules) to the passively collected log 102A, to generate and save in an alert DB 103 a first alert (step S112).

In a sequence DB 104, a time-series attack detection rule (also referred to as sequence) is defined in which an attack that produces a threat is detected for each threat. For example, a sequence is provided as "A→(B or C)→D→E". That is, the attack detection rule conforming to order of A→(B or C)→D→E means that an event such as a malfunction or a failure occurs in the monitored object in order of Y1→(Y2.1 or Y2.2)→Y3→Y4, and the threat X is detected.

The monitor extracts as the same threat rule, with reference to the sequence DB 104, another rule in a sequence including the passive rules A and D based on which the first alert is generated in alert generation (step S112), from among the attack detection rules (hereinafter, active rules) B, C, and E determined in the active scheme (step S113), and specifies a monitored object 110B (in FIG. 1, fingerprint authenticator as an example) applied with the same threat rule (step S114).

The monitor transmits a log collection request to the monitored object 110B applied with such the same threat rule, and actively collects (step S116) and saves as an actively collected log a log from the monitored object 110B. The monitor applies an active rule to an actively collected log 102B like the case of the passive rule (step S112), and generates and saves a second alert in an alert DB 103 (step S117).

To a score DB 105, a score is set for each threat, which assigns a weight to the attack detection rule defining such the threat. The monitor judges whether or not the sum of at least one score of the passive rules A and D based on which the first alert is generated and at least one score of the active rules B, C, and E based on which the second alert is generated is equal to or larger than a threshold value. In a case where the sum is equal to or larger than the threshold value, the monitor detects a predicted threat X or an occurred threat X. In this manner, collection schemes of logs according to an attack detection rule is sorted into the passive scheme and the active scheme, so that the passive scheme allows detection of all attacks so as to restrain reduction in detection accuracy, while the active scheme allows reduction in a communication cost.

System Configuration Example of Monitoring System

Figure 2:
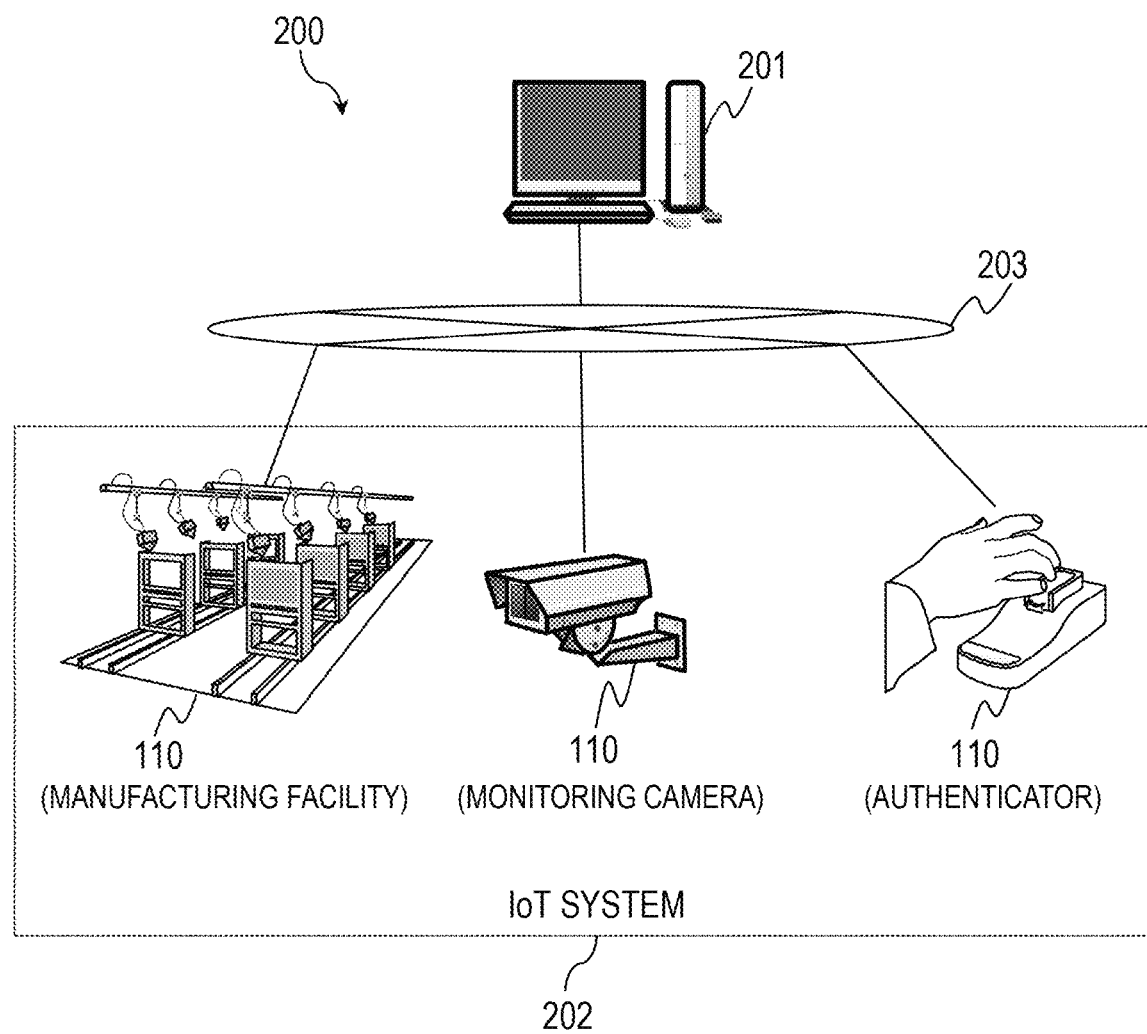
FIG. 2 is an illustrative view showing a system configuration example of a monitoring system.

FIG. 2 is an illustrative view showing a system configuration example of a monitoring system. The monitoring system 200 has a monitor 201 and one or more IoT systems 202. The monitor 201 and the IoT system 202 are communicably connected to each other in a wired or wireless way through a network 203 such as Internet.

The monitor 201 executes the log collection scheme determination phase F1 and the threat detection phase F2 as described in FIG. 1. Details of the monitor 201 are described in FIGS. 3 to 7. The IoT system 202 has one or more IoT devices 110. The IoT system 202 includes a manufacturing facility, a monitoring camera, and an authenticator, for example. Details of the IoT device 110 are described in FIGS. 8 and 9.

Note that the IoT device 110 is an example of a monitored object from the monitor 201, and the monitored object may be not only the IoT system 202, but also a communication device that is communicably connected to the monitor 201 through the network 203, such as a network device such as a router and a switch, a calculator such as a personal computer and a server, and a communication terminal such as a smartphone and a tablet.

Hardware Configuration Example of the Monitor 201

Figure 3:
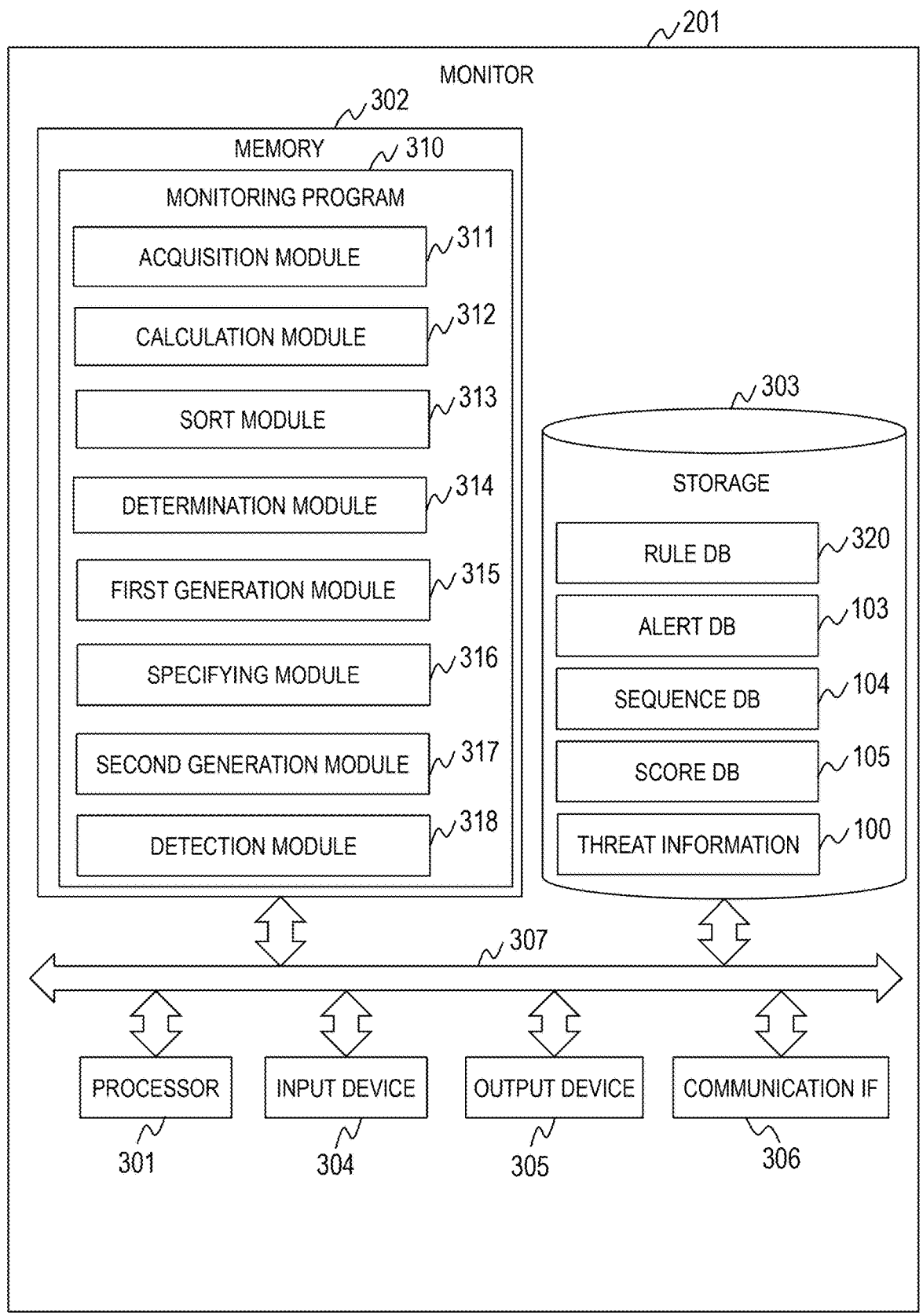
FIG. 3 is a block diagram illustrating a hardware configuration example of the monitor.

FIG. 3 is a block diagram illustrating a hardware configuration example of the monitor 201. The monitor 201 includes a processor 301, a storage device 302, an input device 303, an output device 304, and a communication interface (communication IF) 305. The processor 301, the storage device 302, the input device 303, the output device 304, and the communication IF 305 are connected to one another by a bus 306. The processor 301 controls the monitor 201. The processor 301 executes various programs. The storage device 302 serves as a work area of the processor 301. The storage device 302 is a non-transitory or temporary recording medium which stores the various programs and data.

Specifically, for example, the memory 302 stores a monitoring program 310. The monitoring program 310 has, as software modules, an acquisition module 311, a calculation module 312, a sort module 313, a determination module 314, a first generation module 315, a specifying module 316, a second generation module 317, and a detection module 318. Details of respective modules 311 to 318 are described below.

The storage 303 is a non-transitory or transitory storage medium that stores various types of DBs (databases). The storage 303 includes a rule DB 320, an alert DB 103, a sequence DB 104, and a score DB 105. Details of respective DBs 320, and 103 to 105 are described below. The storage 303 may be present in another computer accessible through the network 203 to the monitor 201 outside the monitor 201. The memory 302 and the storage 303 are referred to as a storage device. The storage device 302 can be, for example, a read-only memory (ROM), a random access memory (RAM), a hard disk drive (HDD), or a flash memory. The input device 303 inputs data. The input device 303 can be, for example, a keyboard, a mouse, a touch panel, a ten-key pad, or a scanner. The output device 304 outputs data. The output device 304 can be, for example, a display or a printer. The communication IF 305 couples to a network to transmit and receive data.

Rule DB 320

FIG. 4 is an illustrative view showing an example of memory contents of the rule DB 320. The rule DB 320 is a database that stores the attack detection rule described above. The rule DB 320 has, as fields, a threat ID 401, a risk value 402, a rule ID 403, a log collector ID 404, contents of rule 405, importance 406, a detection cost 407, and a collection scheme 408. A combination of values of respective fields 401 to 407 in a row is an entry that defines one attack detection rule.

The thread ID 401 is an ID that uniquely specifies a threat. The risk value 402 is an index value that indicates a risk of a threat specified by the threat ID 401. In the present example, a higher risk value 402 indicates a riskier threat. The risk value 402 is a value obtained using a prior threat analysis for each threat. The risk values 402 of the same threat are the same. Furthermore, since a plurality of threats may be related to one threat, each of the threat ID 401 and the risk value 402 sometimes overlap with the other.

The rule ID 403 is identification information uniquely specifying an attack detection rule. Note that the rule ID 403 may represent an attack detection rule of "xxx" (x is an arbitrary string) as an "attack detection rule xxx". The log collector ID 404 is identification information uniquely specifying a log collector. The log collector is a monitored object, for example, the IoT device 110 that is a collection target of a log.

The contents of rule 405 are information indicating contents of an attack detection rule specified by the rule ID 403. For example, the contents of rule 405 in an entry of the first row (attack detection rule abc123) are provided as "receiving an authentication error in the same source address from a plurality of devices", however the log collector IDs 404 of "D1", "D2", and "D3" are provided, and therefore it means "receiving an authentication error in the same source address from IoT devices D1 to D3".

The threat 401, the risk value 402, the rule ID 403, the log collector ID404, and the contents of rule 405 are provided as the threat information 100 preset in the FT analysis.

The importance 406 is an index value that indicates importance of an attack detection rule specified by the rule ID 403. The importance 406 is increased as a cause corresponding to the attack detection rule specified by the rule ID 403 is required more for an occurrence of a threat. Specifically, for example, in the threat information 100, a smaller number of logical symbols of sum 100B from a top event (for example, threat X) to an event corresponding to an attack detection rule increases the importance 406. The importance 406 is, for example, the reciprocal of the number of the logical symbol of sum 100B.

In an example of the threat information 100 in FIG. 1, the importance 406 of rules A, D, and E corresponding to causes Y1, Y3, and Y4 is higher than the importance 406 of rules of B and C corresponding to causes Y2.1 and Y2.2. The monitor 201 calculates the importance 406 for each entry by means of the calculation module with reference to the threat information 100 and stores such the importance 406 in the rule DB 320.

The detection cost 407 is a value of multiplying a communication cost per unit time for one IoT device 110 that collects a log according to the attack detection rule specified by the rule ID 403 by the number of the IoT devices 110 specified by the log collector ID 404 (the number of the log collector IDs 404). The communication cost is a cost of communication between the IoT device 110 as a monitored object and the monitor 201, and is given as a known value. The monitor 201 calculates the detection cost 407 for each entry by means of the calculation module 312 and stores such the detection cost 407 in the rule DB 320.

The collection scheme 408 is a scheme for collecting a log from the IoT device 110 specified by the log collector ID 404. "Passive" is a scheme for receiving by the monitor 201 and storing in the storage 303 a log from such the IoT device 110. "Active" is a scheme for receiving by the monitor 201 and stores in the storage 303 a log from such the IoT device 110 only in a case where a request is made from the monitor 201 to such the IoT device 110. The monitor 201 determines and stores in the rule DB 320 the collection scheme 408 for each entry by the sort module 313 and the determination module 314.

Note that the monitor 201 transmits the collection scheme 408 to the IoT device 110 specified by the log collector ID 404 of the entry to which the collection scheme 408 is set. Thereby, the destination IoT device 110 transmits a log according to the collection scheme 408.

Alert DB 103

FIG. 5 is an illustrative view showing an example of memory contents of the alert DB 103. The alert DB 103 is a database in which the monitor 201 stores alerts generated by the first generation module 315 and the second generation module 317. The alert DB 103 has, as fields, an alert ID 501, a time of occurrence 502, and contents of alert 503. A combination of values of respective fields 501 to 503 in a row is an entry that defines one alert.

The alert ID 501 is identification information uniquely specifying an alert, and uses a value of the rule ID 403 of an attack detection rule used for generating such the alert. The time of occurrence 502 is a time when the alert specified by the alert ID 501 occurs. The contents of alert 503 are contents of the alert specified by the alert ID 501, for which the contents of rule 405 of the same entry as the rule 403 coincident with the alert ID 501 are diverted.

Sequence DB 104

FIG. 6 is an illustrative view showing an example of memory contents of the sequence DB 104. The sequence DB 104 is a database that preliminarily stores a sequence. The sequence DB 104 has, as fields, a threat ID 401 and contents of sequence 601. A combination of values of respective fields 401 and 601 in a row is an entry that defines one sequence. A sequence is provided for alert IDs 501 (rule IDs 403) aligned in time series.

That is, an occurrence of the alert specified by the alert ID 501 in the order defined in the sequence indicates an occurrence of a threat specified by the threat ID 401. Note that because the alert ID 501 coincides with the rule ID 403, the contents of sequence 601 are provided for a time-series rule ID 403 in which an attack that causes a threat is detected, as described above. In two alert IDs 501 (rule IDs 403) connected to each other by an arrow, the alert ID 501 at the beginning of the arrow indicates an alert that has occurred prior to the alert ID 501 at the end of the arrow.

Score DB 105

FIG. 7 is an illustrative view showing an example of memory contents of the score DB 105. The score DB 105 is a database that stores a score indicating a weight of an attack detection rule. The score DB 105 has, as fields, the threat ID 401, a threshold value 701, the rule ID 403, and a score 702.

The threshold value 701 is a reference value that indicates whether or not a threat is specified by the threat ID 401. Specifically, for example, the threshold value 701 is compared to the sum of the scores 702 of the rule ID 403 considered as the alert ID 501 of a group of corresponding rule IDs 403. The score 702 indicates the degree of adaptability of the attack detection rule specified by a corresponding rule ID 403 (whether a corresponding alert easily occurs). As the score 702 is larger, an event detected according to the attack detection rule easily occurs.

For example, in a case where "abc123", "abc456", and "abc789" as the rule IDs 403 are provided as the alert IDs 501 to generate an alert, the score 702 of prediction for an occurrence of a threat with the threat ID 401 of "12" provides "50" as the sum of values of respective scores 702, "20", "20", and "10", corresponding to "abc123", "abc456", and "abc789". The threshold value 701 of the threat with the threat ID 401 of "12" is "70". In this case, since "50" as the sum is not equal to or larger than "70" as the threshold value 701, the monitor 201 judges that the threat ID 401 of "12" has not occurred yet.

On the other hand, in a case where "abc123", "abc456", and "def789" as the rule IDs 403 are considered as the alert ID 501 to generate an alert, a score of prediction for an occurrence of a threat with the threat ID 401 of "12" provides "70" as the sum of values of respective scores 702, "20", "20", and "30", corresponding to "abc123", "abc456", and "def789". The threshold value 701 of the threat with the threat ID 401 of "12" is "70". In this case, since "70" as the sum is equal to or larger than "70" as the threshold value 701, the monitor 201 judges that the threat ID 401 of "12" has occurred.

Hardware Configuration Example of IoT Device 110

Figure 8:
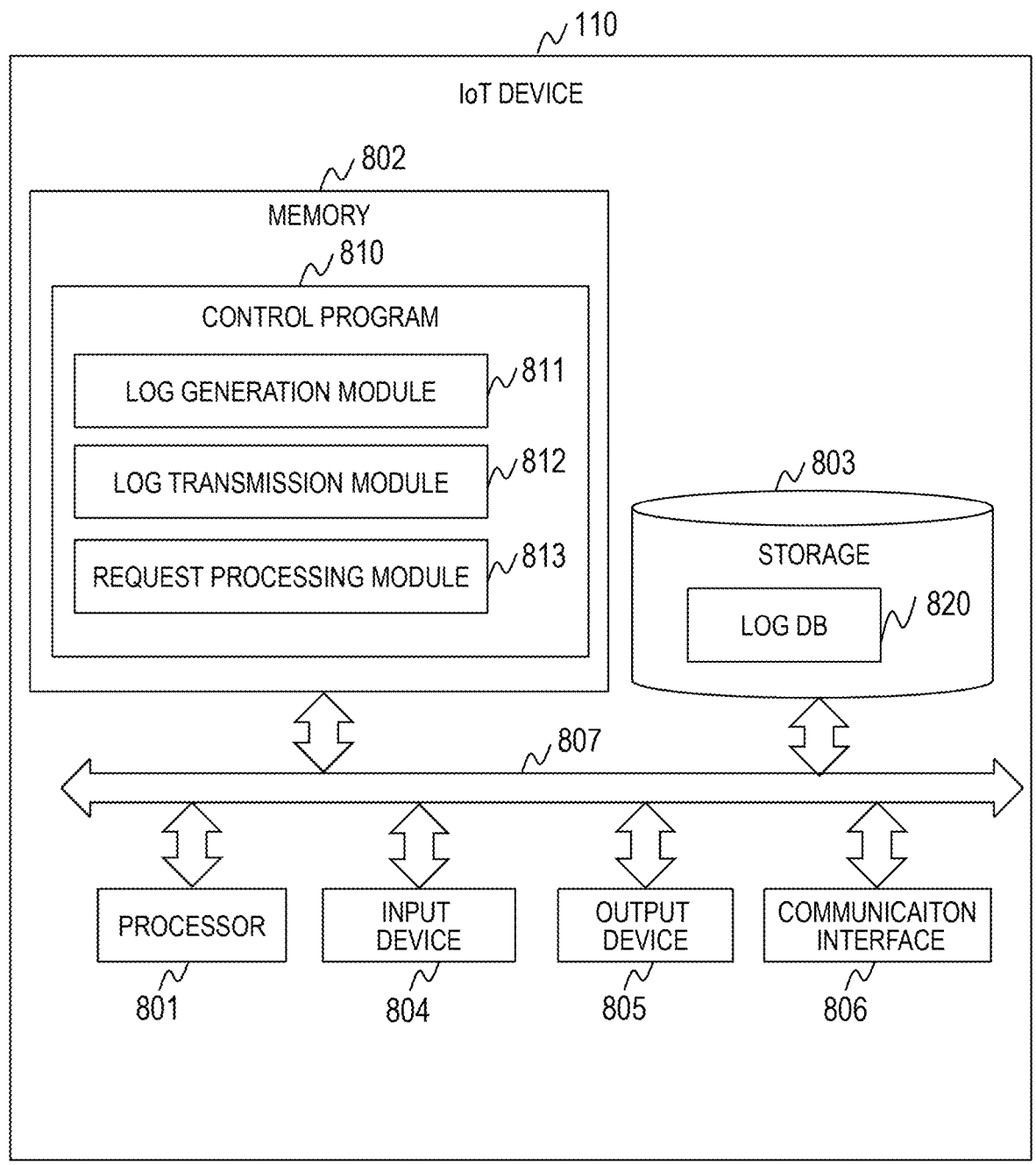
FIG. 8 is a block diagram illustrating a hardware configuration example of the IoT device.

FIG. 8 is a block diagram illustrating a hardware configuration example of the IoT device 110. The IoT device 110 includes a processor 801, a memory 802, a storage device 803, an input device 804, an output device 805, and a communication interface (communication IF) 806. The processor 801, the memory 802, the storage device 803, the input device 804, the output device 805, and the communication IF 806 are connected to one another by a bus 807. The processor 801 controls the IoT device 110. The processor 801 executes various programs. The memory 802 serves as a work area of the processor 801. The memory 802 is a recording medium which stores the various programs and data.

Specifically, for example, the memory 802 stores a control program 810. The control program 810 has, as software modules, a log generation module 811, a log transmission module 812, and a request processing module 813. Details of respective modules 811 to 813 are described below.

The storage device 803 is a non-transitory or temporary recording medium which stores the various programs and data. The memory 802 and the storage 803 are referred to as a storage device. The storage device 803 can be, for example, a read-only memory (ROM), a random access memory (RAM), a hard disk drive (HDD), or a flash memory. The input device 804 inputs data. The input device 804 can be, for example, a keyboard, a mouse, a touch panel, a ten-key pad, or a scanner. The output device 805 outputs data. The output device 805 can be, for example, a display or a printer. The communication IF 806 couples to a network to transmit and receive data. Now, a description is given of an embodiment of this invention.

Note that the IoT device 110 in "passive" set as the collection scheme 408 of the rule DB 320 in the monitor 201 generates a log by means of the log generation module 811 and stores the log in a log DB 820, while transmitting the log to the monitor 201. On the other hand, the IoT device 110 in "active" set as the collection scheme 408 of the rule DB 320 in the monitor 201 generates a log by means of the log generation module 811 and stores the log in the log DB 820, however does not transmit the log to the monitor 201. In this case, the monitor 201 transmits, in a case where a log is requested from the monitor 201 by means of the request processing module 813, the log in a requested range to the monitor 201.

Log DB 820

Figures 9, 10:
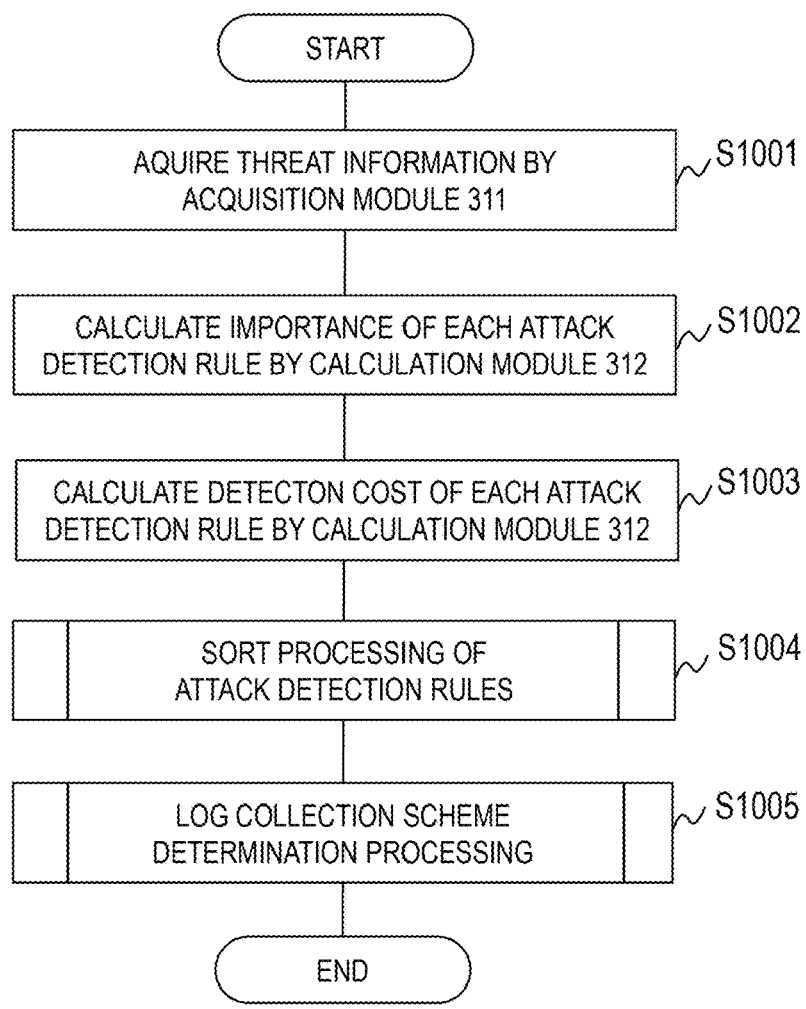
FIG. 9 is an illustrative view showing an example of memory contents in the log DB that is stored in the storage of the IoT device.
FIG. 10 is a flow chart showing an example of a detailed processing procedure in the log collection scheme determination phase F1 by the monitor.

FIG. 9 is an illustrative view showing an example of memory contents in the log DB 820 that is stored in the storage 303 of the IoT device 110. The log DB 820 is a database that stores a log generated by the IoT device 110. The log DB 820 has a timestamp 901 and log detail information 902. A combination of values of respective fields in a row is an entry that defines one log. The timestamp 901 is a time of occurrence of a log. The log detail information 902 indicates detailed information of a log.

In a case where a device ID of the IoT device 110 corresponds to the log collector ID 404 and the collection scheme 408 is "passive", a log is collected as the passively collected log 102A in the monitor 201 all the time and saved in the storage 303 of the monitor 201. In a case where the device ID of the IoT device 110 corresponds to the log collector ID 404 and the collection scheme 408 is "active", a log is, only in a case where a request is made from the monitor 201, collected as the actively collected log 102B and saved in the storage 303 of the monitor 201.

Log Collection Scheme Determination Phase F1

FIG. 10 is a flow chart showing an example of a detailed processing procedure in the log collection scheme determination phase F1 by the monitor 201. The monitor 201 acquires the threat information 100 from the storage 303 by means of the acquisition module (step S1001). The monitor 201 calculates by means of the calculation module 312 with reference to the threat information 100 and stores in the rule DB 320 the importance 406 of each attack detection rule (step S1002).

The monitor 201 calculates by means of the calculation module 312 and stores in the rule DB 320 the detection cost 407 of each attack detection rule (step S1003). The monitor 201 executes by means of the sort module 313 sort processing of an attack detection rule based on the risk value 402, the importance 406, and the detection cost 407 (step S1004). Details of the sort processing of the attack detection rule (step S1004) are described below in FIGS. 11 and 12.

The monitor 201 executes log collection scheme determination processing by means of the determination module 314 (step S1005), and stores the collection scheme 408 of each attack detection rule in the rule DB 320. Details of the log collection scheme determination processing (step S1005) are described below in FIGS. 13 and 14.

Sort Processing of Attack Detection Rule (Step S1004)

Figure 11:
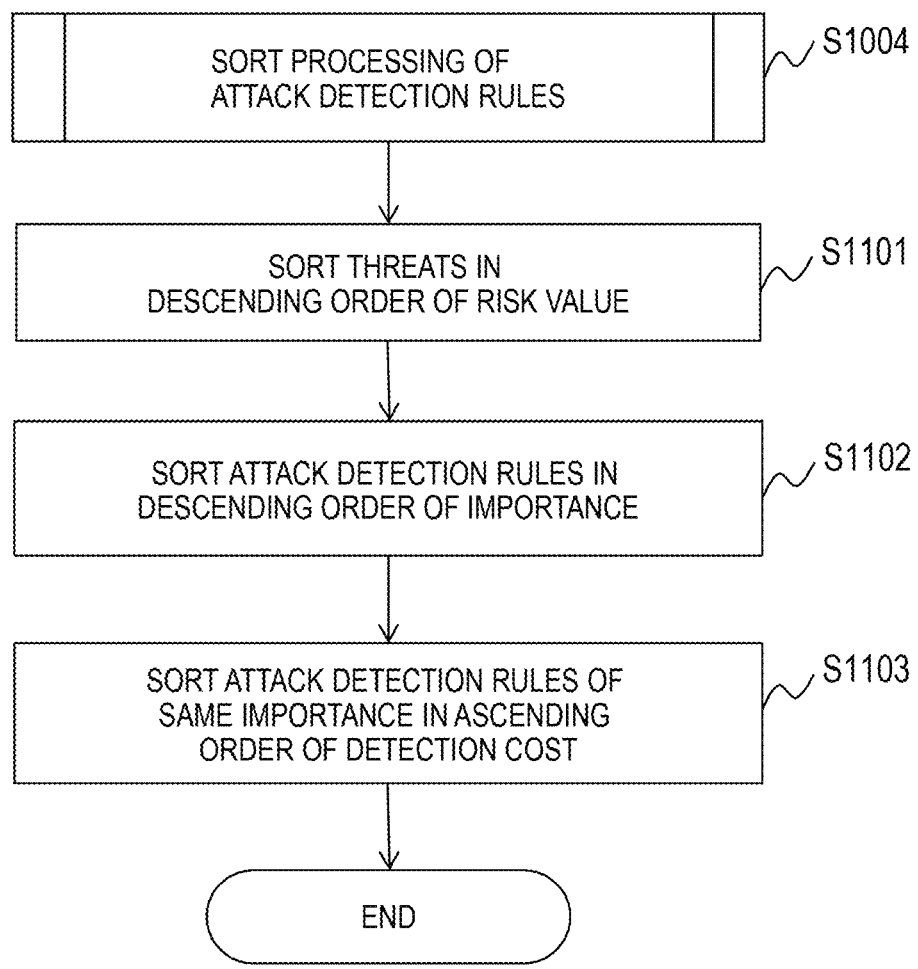
FIG. 11 is a flowchart showing an example of a detailed processing procedure for the sort processing of the attack detection rule (step S1004).

FIG. 11 is a flowchart showing an example of a detailed processing procedure for the sort processing of the attack detection rule (step S1004). The monitor 201 sorts attack detection rules in descending order of the risk value 402 (step S1101). Since the risk values 402 are the same in a case where the threat IDs 401 are the same, aggregation for each threat ID 401 is performed for the rule DB 320.

The monitor 201 sorts the attack detection rules of the same threat IDs 401 in descending order of the importance 406 in the rule DB 320 after sort at step S1101 (step S1102). The monitor 201 sorts the attack detection rules of the same importance 406 in ascending order of the detection cost 407 in the rule DB 320 after sort at step S1101 (step S1103).

Figure 12:
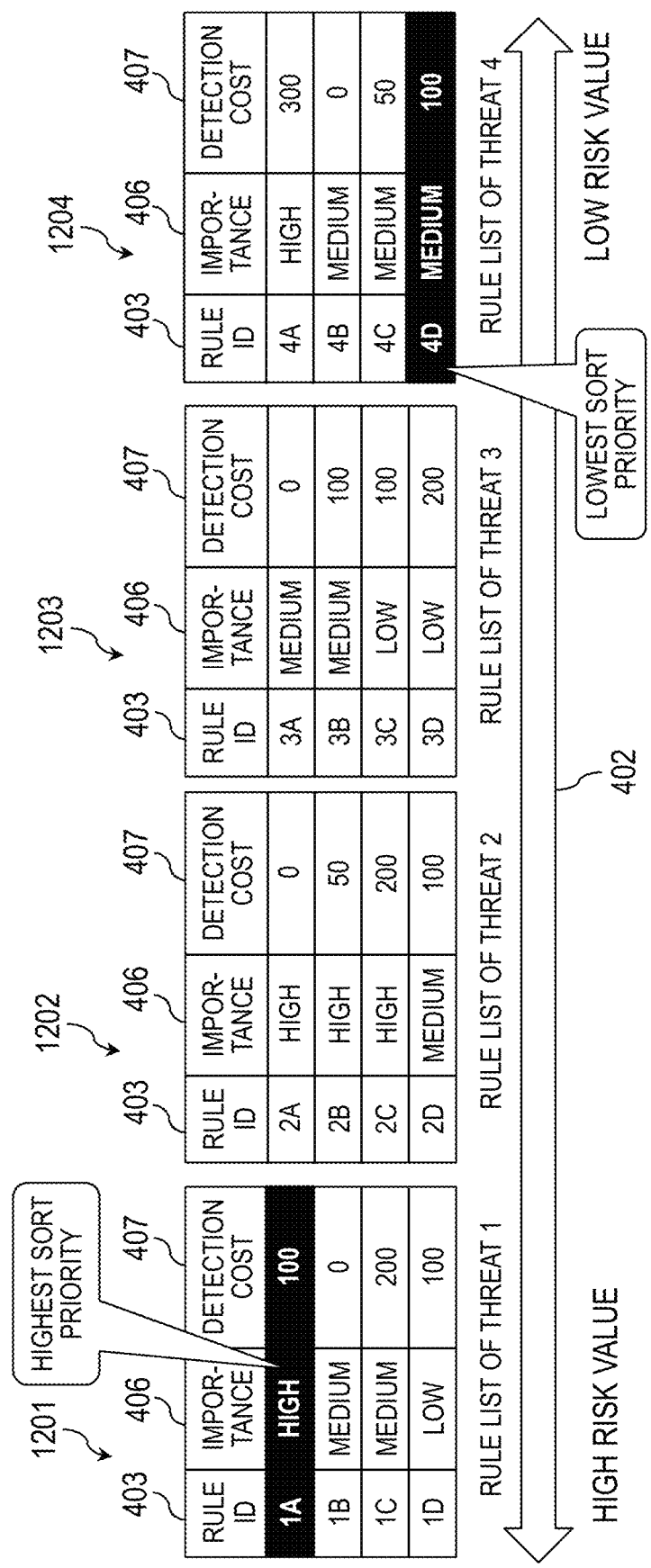
FIG. 12 is an illustrative view showing an example of processing for the sort processing of the attack detection rule (step S1004).

FIG. 12 is an illustrative view showing an example of processing for the sort processing of the attack detection rule (step S1004). In FIG. 12, in rule lists 1201 to 1204, attack detection rules are aggregated per same threat. The rule list 1201 has a threat ID 401 of a threat 1, the rule list 1202 has a threat ID 401 of a threat 2, the rule list 1203 has a threat ID 401 of a threat 3, and the rule list 1204 has a threat ID 401 of a threat 4. In FIG. 12, the risk value 402 increases in order of the rule lists 1201 to 1204.

At step S1101, in the rule lists 1201 to 1204, the risk values 402 are sorted in descending order. At step S1102, in each of the rule lists 1201 to 1204, importance 406 is sorted in descending order. At step S1103, in each of the rule lists 1201 to 1204, in the same entry of the same importance 406, the detection costs 407 are sorted in ascending order. For example, since for the rule ID 403 of the rule list 1201 in both entries of 1B and 1C, the importance 406 is indicated as "medium" for both, 1B with a lower detection cost 407 is sorted above 1C.

In the rule lists 1201 to 1204, an attack detection rule with the rule ID 403 of 1A is provided for a threat of the highest risk value 402 and an entry of the highest sort priority. On the other hand, in an entry of the lowest sort priority, an attack detection rule with the rule ID 403 of 4D is provided. The sort priority is the importance 406, and determination is made as to which detection cost 407 is lower than the other, in the case of the same importance 406.

Log Collection Scheme Determination Processing (Step S1005)

Figure 13:
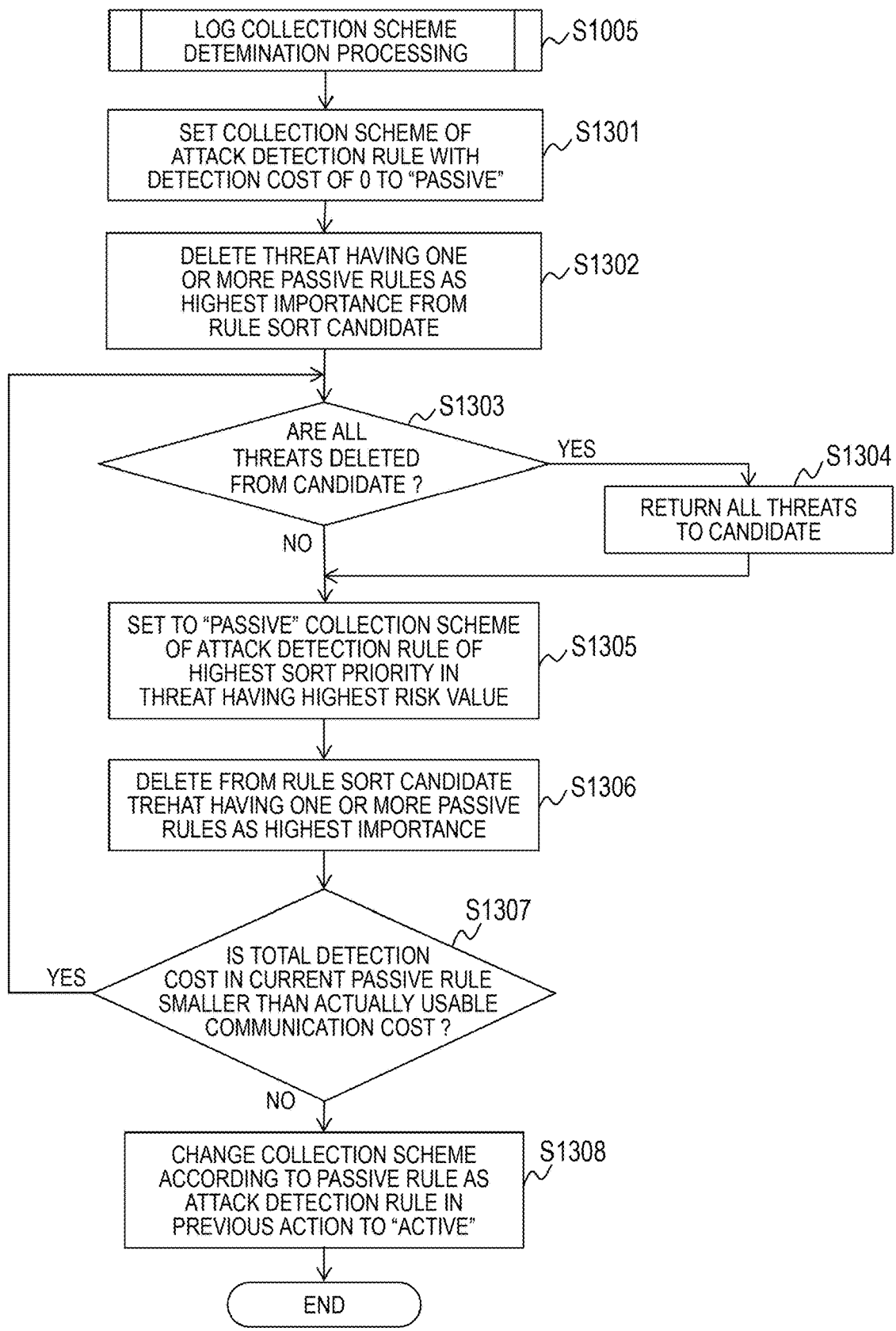
FIG. 13 is a flow chart showing an example of a detailed processing procedure for the log collection scheme determination processing (step S1005).
Figure 14:
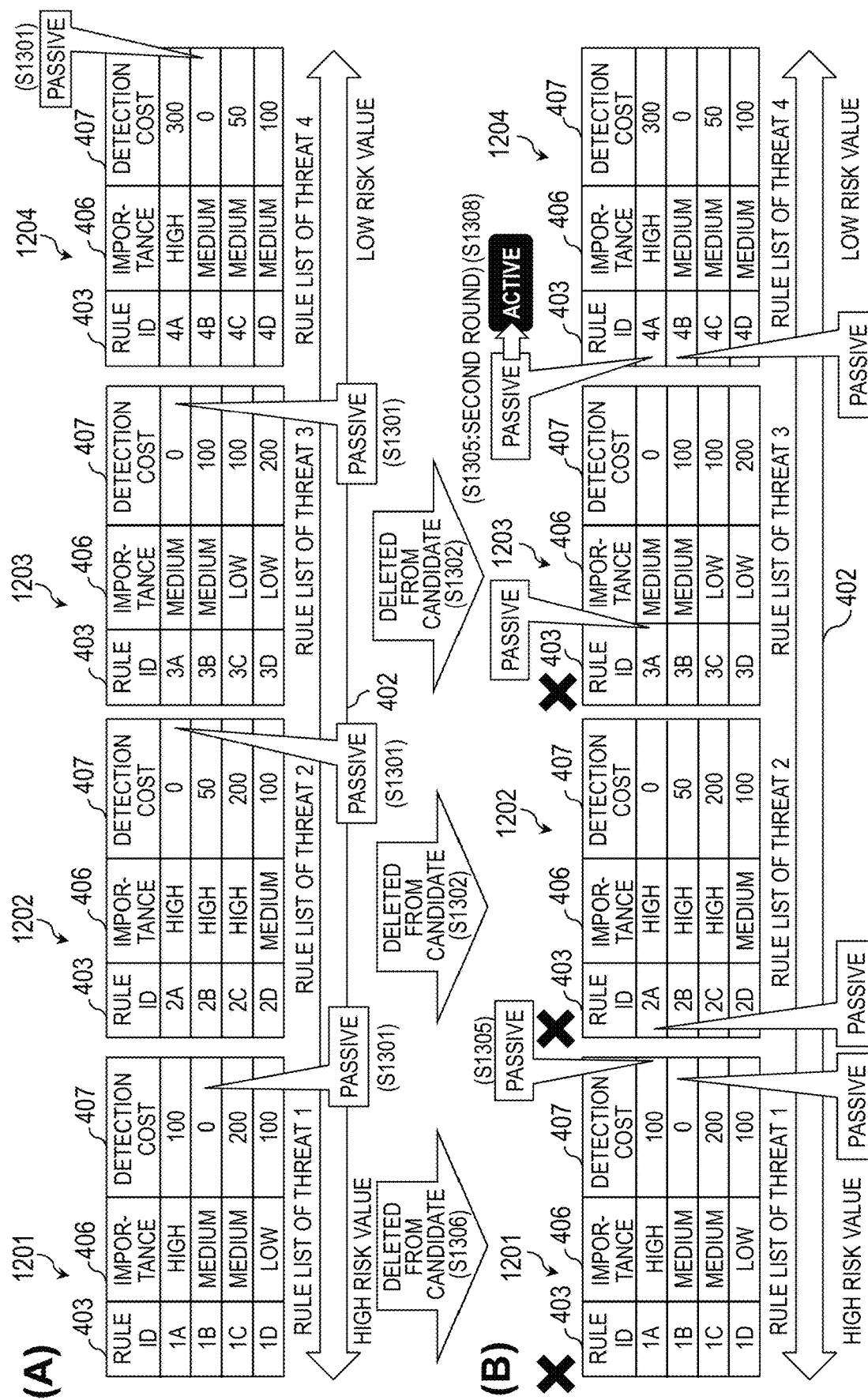
FIG. 14 is an illustrative view showing an example of processing for the log collection scheme determination processing (step S1005).

FIG. 13 is a flow chart showing an example of a detailed processing procedure for the log collection scheme determination processing (step S1005). FIG. 14 is an illustrative view showing an example of processing for the log collection scheme determination processing (step S1005). In FIG. 14, description is given for the rule lists 1201 to 1204 after sort in FIG. 12, as an example.

In FIG. 13, in the monitor 201, the collection scheme 408 according to an attack detection rule for the detection cost 407 which is equal to or less than a predetermined value, for example, "0" is set to "passive" (step S1301). Specifically, for example, as shown in (A) of FIG. 14, the collection scheme 408 according to an attack detection rule with the detection cost of "0" in each rule list is set to "passive".

In FIG. 13, the monitor 201 deletes from a rule sort candidate a threat having one or more passive rules for the highest importance 406 in respective threats (step S1302). Specifically, for example, in (A) of FIG. 14, for the rule list 1202, in an entry with the rule ID 403 of 2A, an attack detection rule of the highest importance 406 in the rule list 1202 is provided. Since the detection cost 407 for the attack detection rule 2A is "0", the collection scheme 408 is set to "passive" at step S1301.

Likewise, for the rule list 1203, in an entry with the rule ID 403 of 3A, an attack detection rule of the highest importance 406 in the rule list 1202 is provided. As the detection cost 407 of the attack detection rule 3A is "0", the collection scheme 408 is set to "passive" at step S1301. Therefore, the threats 2 and 3 for the rule lists 1202 and 1203 are deleted from the rule sort candidate (represented as an X mark in FIG. 13).

In FIG. 13, the monitor 201 judges whether or not all threats are deleted from the rule sort candidate (step S1303). In a case where all threats are deleted from the rule sort candidate (step S1303: Yes), the monitor 201 returns all threats to the rule sort candidate (step S1304), and proceeds to step S1305. In a case where all threats are not deleted from the rule sort candidate (step S1303: No), the process goes to step S1305.

Specifically, for example, in (B) of FIG. 14, as the threat deleted from the rule sort candidate at step S1302 corresponds to the threads 2 and 3 of the rule lists 1202 and 1203, so the threats 1 and 4 remain, the process goes to step S1305 without executing step S1304.

In FIG. 13, in the monitor 201, the collection scheme 408 according to an attack detection rule of the highest sort priority in a threat with the highest risk value 402 is set to "passive" (step S1305). An attack detection rule of which sort priority to be set is highest is an attack detection rule without setting the collection scheme 408. Specifically, for example, in (B) of FIG. 14, the threat of the highest risk value 402 corresponds to the rule list 1201. In the rule list 1201, an attack detection rule of the highest sort priority corresponds to the attack detection rule 1A. In the monitor 201, the collection scheme 408 of the attack detection rule 1A is set to "passive".

In FIG. 13, the monitor 201 deletes from each of the rule sort candidates a threat having one or more passive rules for the highest importance 406 therein (step S1306). Specifically, for example, in (B) of FIG. 14, the highest importance 406 in the rule list 1201 is provided as "high", and such an entry is provided only for the attack detection rule 1A. The collection scheme 408 of the attack detection rule 1A has been set to "passive" at step S1305. Therefore, the rule list 1201 of the threat 1 is deleted from the rule sort candidate (represented as an X mark in FIG. 13).

In FIG. 13, the monitor 201 judges whether or not a total detection cost in a current passive rule is smaller than an actually usable communication cost (step S1307). The actually usable communication cost is provided as a preset value. The total detection cost in the current passive rule is the sum of the detection costs 407 in an attack detection rule set to "passive".

The total detection cost smaller than the actually usable communication cost (step S1307: Yes) means that the communication cost is still enough to be actually usable, so the process returns to step S1303. On the other hand, in a case where the total detection cost is not smaller than the actually usable communication cost (step S1307: No), the process goes to step S1308.

Specifically, for example, in (B) of FIG. 14, the current passive rules correspond to attack detection rules 1A, 1B, 2A, 3A, and 4B in the collection scheme 408 set as "passive". The total detection cost is the sum "100" of values of the detection costs 407 for the attack detection rules 1A, 1B, 2A, 3A, and 4B, "100", "0", "0", "0", and "0". The actually usable communication cost is given as Cth=200, for example. As the total detection cost "100" is smaller than the communication cost Cth (step S1307: Yes), the process returns to step S1303.

At step S1303, since the rule list 1204 of the threat 4 still remains in (B) of FIG. 13, step S1303: No is provided, and the process goes to step S1305. A threat having the highest risk value 402 of the rule sort candidate is the threat 4. An attack detection rule of the highest sort priority without setting the collection scheme 408 in the rule list 1204 of the threat 4 is an attack detection rule 4A. Therefore, the monitor 201 sets the collection scheme 408 of the attack detection rule 4A to "passive" (step S1305).

At step S1306, in the monitor 201, an attack detection rule of the highest importance 406 as "high" in the rule list 1204 of the threat 4, provided as a rule sort candidate is the attack detection rule 4A. The collection scheme 408 of the attack detection rule 4A is not set at the present stage. Therefore, since the threat 4 does not correspond to a threat having one or more passive rules for the highest importance 406 as "high" in the rule list 1204, the threat 4 is not deleted from the rule sort candidate (step S1306).

At step S1307, current passive rules correspond to the attack detection rules 1A, 1B, 2A, 3A, 4A, and 4B in the collection scheme 408 set as "passive". The total detection cost is the sum "400" of values of the detection costs for the attack detection rules 1A, 1B, 2A, 3A, 4A, and 4B, "100", "0", "0", "0", "300", and "0". In this example, the actually usable communication cost is given as Cth=200. As the total detection cost "400" is not smaller than the communication cost Cth (step S1307: No), the process goes to step S1308.

At step 1308, the monitor 201 changes the collection scheme 408 according to the passive rule as an attack detection rule in a previous action to "active" (step S1308). The passive rule as an attack detection rule in a previous action corresponds to the attack detection rule 4A set at step S1305 in the above example. The monitor 201 changes the collection scheme 408 according to the attack detection rule 4A from "passive" to "active". Sorting in such the collection scheme 408 allows reduction in a communication cost when collecting a log from a monitored object without impairing detection accuracy of an attack.

Threat Detection Phase F2

Figure 15:
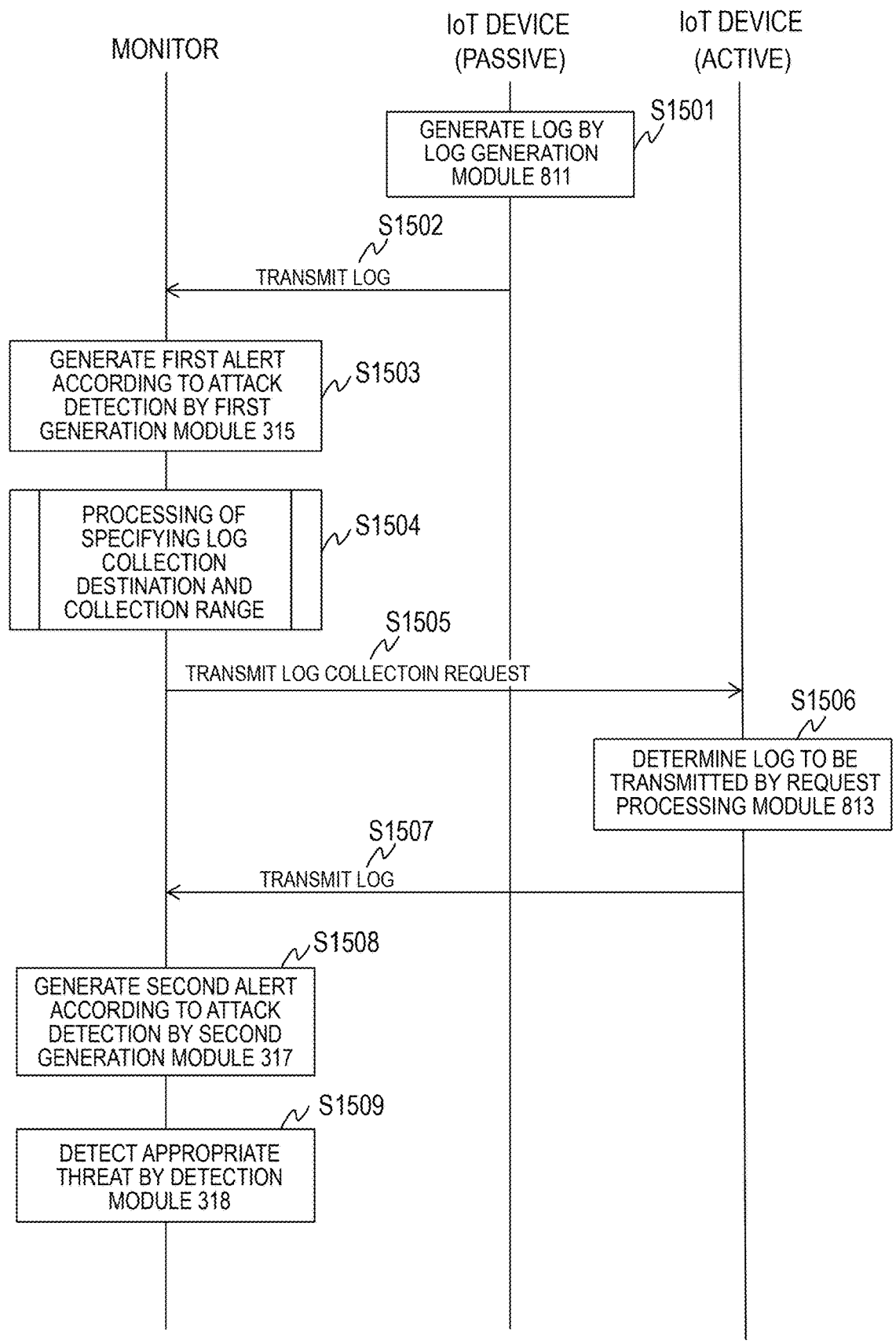
FIG. 15 is a flow chart showing an example of a detailed processing procedure in the threat detection phase F2.

FIG. 15 is a flow chart showing an example of a detailed processing procedure in the threat detection phase F2. The IoT device 110 according to the passive rule generates a log by means of the log generation module 811 (step S1501). The IoT device 110 according to the passive rule transmits the generated log to the monitor 201 by means of the log transmission module 812 (step S1502).

The monitor 201 analyzes by means of the first generation module 315 a received log, and for the log adapted to an attack detection rule, generates and stores in the alert DB 103 a first alert (step S1503). The monitor 201 executes specifying processing of a log collection destination and a collection range (step S1504). The log collection destination corresponds to the IoT device 110 for which the monitor 201 collects a log in the case of actively collecting a log and which follows an active rule. The collection range is a range for the timestamp 901 of a log to be collected. Details of specifying processing of the log collection destination and the collection range (step S1504) are described below in FIG. 16.

The monitor 201 transmits a log collection request to the log collection destination (step S1505). In the IoT device 110 that follows the active rule, the request processing module 813 determines from the log DB 820 a log to be transmitted (step S1506). Then, the IoT device 110 that follows the active rule transmits the log to be transmitted to the monitor 201 (step S1507).

The monitor 201 analyzes by means of the second generation module 317 a received log, and for the log adapted to an attack detection rule, generates (step S1508) and stores in the alert DB 103 a second alert. The monitor 201 detects by means of the detection module 318 an appropriate threat (step S1509). Specifically, for example, the monitor 201 judges, with reference to the score DB 105, whether or not the sum of the score 702 of the passive rule based on which the first alert is generated and the score 702 of the active rule based on which the second alert is generated is equal to or larger than a threshold value 701 of a corresponding threat.

In a case where the sum is equal to or larger than the threshold value 701, the monitor 201 detects a predicted threat or an occurred threat. In this manner, the collection schemes 408 of the log according to the attack detection rule are sorted into the passive scheme and the active scheme, so that the passive scheme allows detection of all attacks so as to restrain reduction in detection accuracy, while the active scheme allows reduction in a communication cost. Note that step S1509 may be executed after step S1503. That is, the monitor 201 may judge whether or not the sum of the score 702 of the passive rule based on which the first alert is generated is equal to or larger than the threshold value 701 of a corresponding threat.

Specifying Processing of Log Collection Destination and Log Range (Step S1504)

Figure 16:
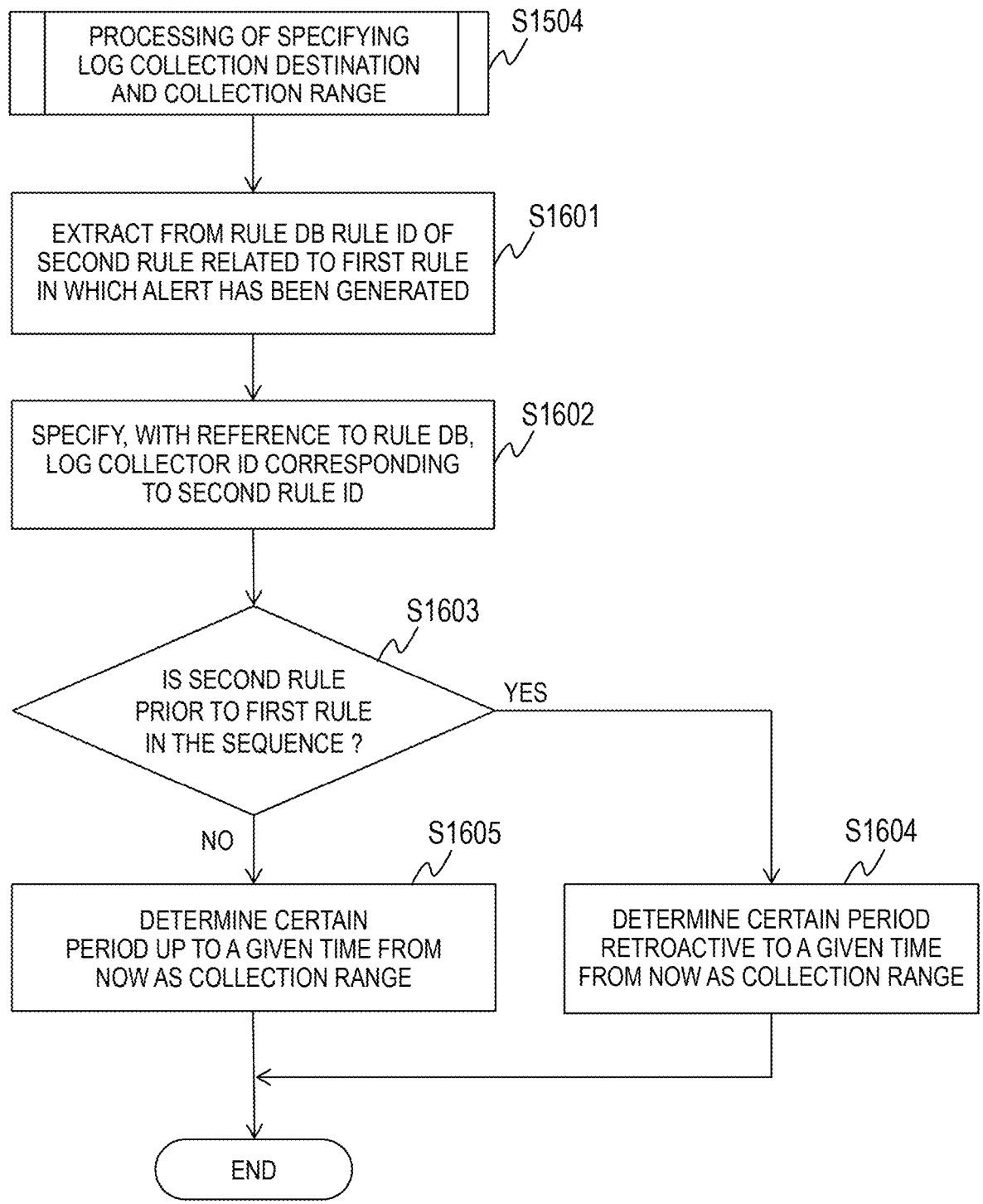
FIG. 16 is a flow chart showing an example of a detailed processing procedure for specifying processing of a log collection destination and a log range (step S1504).

FIG. 16 is a flow chart showing an example of a detailed processing procedure for specifying processing of a log collection destination and a log range (step S1504). The monitor 201 extracts the rule ID 403 of a second rule related to a passive rule according to which an alert is generated (hereinafter, first rule) from the rule DB 320 (step S1601). Specifically, for example, the second rule related to the first rule is an attack detection rule included in a threat same as that of the first rule.

The monitor 201 specifies, with reference to the rule DB 320, the log collector ID 404 corresponding to the rule ID 403 of the second rule (step S1602). The IoT device 110 of a specified log collector ID 404 corresponds to the log collection destination.

The monitor 201 judges, with reference to the sequence DB 104, whether or not the rule ID 403 of the second rule (alert ID 501) is prior to the rule ID 403 of the first rule (alert ID 501) (step S1603). In a case where the rule ID 403 of the second rule is prior to the rule ID 403 of the first rule (step S1603: Yes), the monitor 201 determines a certain period retroactive to a given time from now as a collection range (step S1604), and finishes the specifying processing of the log collection destination and the log range (step S1504).

On the other hand, in a case where the rule ID 403 of the second rule is not prior to the rule ID 403 of the first rule (step S1603: No), the monitor 201 determines a certain period up to a given time from now as a collection range (step S1605), and finishes the specifying processing of the log collection destination and the log range (step S1504).

Thereby, the monitor 201 will transmit to a log collector specified at step S1602 a log collection request for requesting a log in the collection range determined at step S1604 or step S1605 (step S1505).

Figure 17:
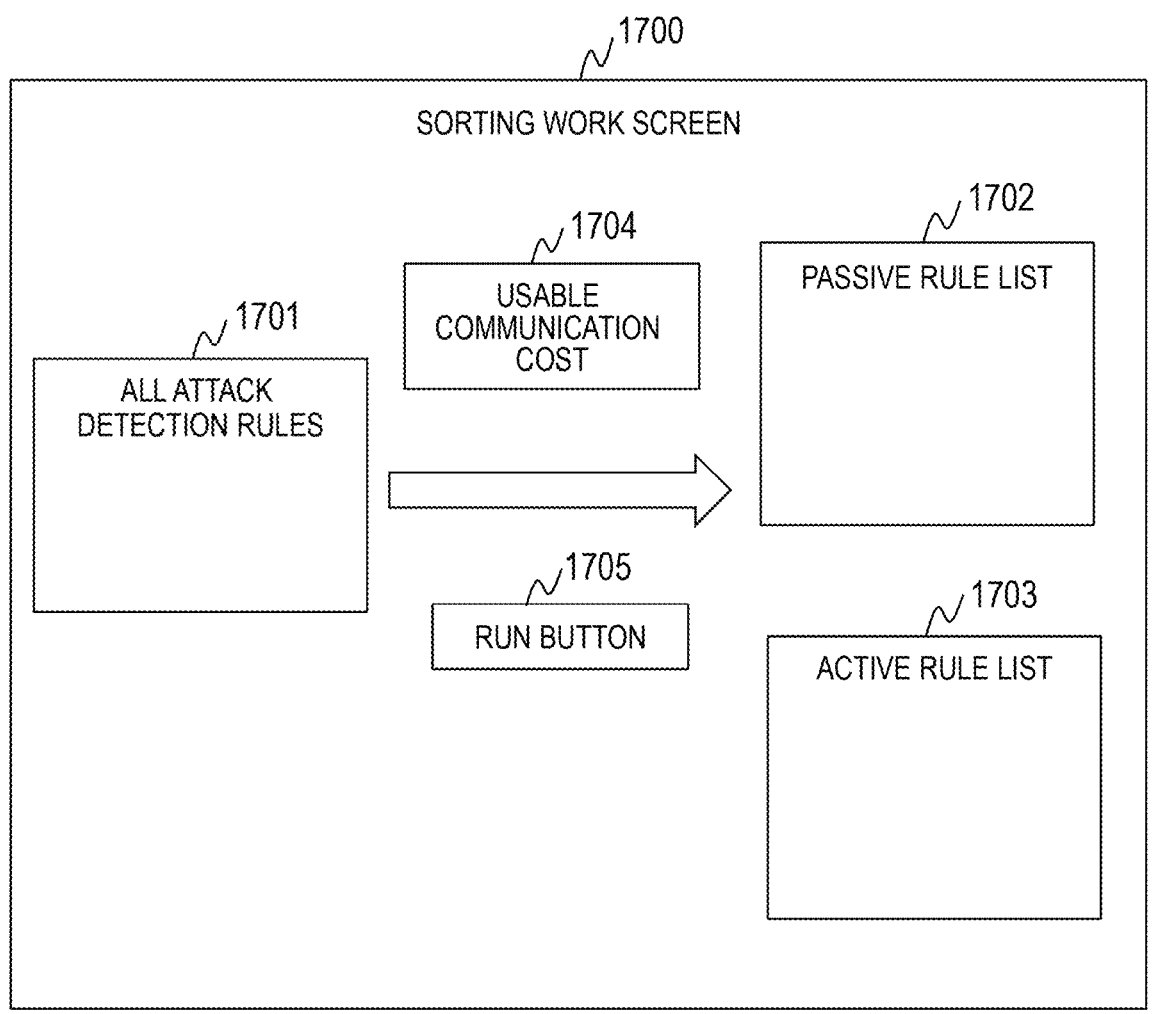
FIG. 17 is an illustrative view showing an example of a sorting work screen.

FIG. 17 is an illustrative view showing an example of a sorting work screen. A sorting work screen 1700 is displayed on the output device 305 of the monitor 201. The sorting work screen 1700 has an area 1701 displaying all attack detection rules, an area 1702 displaying passive rules, an area 1703 displaying active rules, an entry field 1704 for a communication cost, and a run button 1705.

The area 1701 displaying all attack detection rules is an area where the rule ID 403 and the contents of rule 405 in the rule DB 320 are displayed. The area 1702 displaying passive rules is an area where the rule ID 403 of the passive rule and the contents of rule 405 in the rule DB 320 are displayed. The area 1703 displaying active rules is an area where the rule ID 403 of the active rule and the contents of rule 405 in the rule DB 320 are displayed.

The entry field 1704 for a communication cost is a region for inputting a usable communication cost when monitoring the IoT device 110 (step S1307). When the run button 1705 is pressed in a state where a numerical value is input in the entry field 1704, sort processing is implemented, and attack determination rules are newly displayed that are sorted into the area 1702 displaying passive rules and the area 1703 displaying active rules. A sorter is able to confirm how an attack detection rule is sorted while changing a numerical value of the entry field 1704.

Note that in the example described above, in FIG. 13, after a rule in which the detection cost 407 is equal to or less than a predetermined value is set as a passive rule, an attack detection rule of a high risk value 402 and high importance 406 (sort priority) is added as a passive rule so that the total detection cost falls within a communication cost, and in the case of exceeding the communication cost, the attack detection rule of a high sort priority added in a previous action has been sorted into the active rule.

However, the monitor 201 may set not only the detection cost 407 so as to be equal to or less than a predetermined value, but also, for each threat (rule list), an attack detection rule of a relatively low detection cost in a rule list (attack detection rule of at least a not highest detection cost 407 in a rule list) to a passive rule, at step S1301.

Moreover, in FIG. 13, an attack detection rule for the risk value 402 and the importance 406 (sort priority) that are equal to or larger than a predetermined value is set to a passive rule in advance such that a total detection cost does not exceed a communication cost, followed by addition of an attack detection rule of a low risk value 402 and low importance 406 (sort priority) as a passive rule such that the total detection cost falls within the communication cost, then in the case of exceeding the communication cost, the attack detection rule of a low sort priority added in a previous action may be sorted into the active rule.

Also, in this case, the monitor 201 may set not only the risk value 402 so as to be equal to or larger than a predetermined value, but also an attack detection rule of a relatively high risk value 402 in an attack detection rule group 101s (attack detection rule of at least a not lowest risk value 402 in an attack detection rule group 101s) to a passive rule. Likewise, the monitor 201 may set the importance 406 (sort priority) so as to be equal to or larger than a predetermined value, but also an attack detection rule of a relatively high risk value 402 in a rule list (attack detection rule of at least not lowest importance 406 (sort priority) in a rule list) to a passive rule.

Further, the risk value 402 is used in all examples described above, however, may not be considered. For example, in a case where the risk value 402 has not been obtained in the FT analysis, or an analyst judges that the risk value 402 is not necessary, the monitor 201 may execute the log collection scheme determination phase F1 and the threat detection phase F2 without taking the risk value 402 into account.

(1) In this manner, the monitor 201 according to the present example executes acquisition processing by the acquisition module 311 for acquiring the threat information 100 indicating association of a plurality of events necessary for an occurrence of a threat, and determination processing by the determination module 314 for determining, as the collection scheme 408 of the log from the IoT device 110 according to an attack detection rule for detecting an attack on the IoT device 110, either a passive scheme for collecting a log transmitted from the IoT device 110 or an active scheme for collecting from the IoT device 110 a log requested from the monitor 201 to the IoT device 110.

This allows reduction in a communication cost in collection of a log from a monitored object without impairing detection accuracy of an attack.

(2) Further, in the above (1), the monitor 201 executes calculation processing by the calculation module 312 for calculating the importance 406 of an attack detection rule based on association of each of a plurality of events with another event, and in determination processing, the monitor 201 may determine, based on the importance 406 of the attack detection rule calculated in the calculation processing, either the passive scheme or the active scheme as the collection scheme 408 of the log.

Thereby, it is possible to use the importance 406 of an attack detection rule for monitoring a log so that the collection scheme 408 is determined with the emphasis on the importance 406. Accordingly, a log collected from the IoT device 110 is sorted into a log actively collected in the event of collection of logs all the time as before in consideration of the importance 406, thereby making it possible to reduce the amount of collection of logs while reducing a communication cost.

(3) Furthermore, in (2) mentioned above, the monitor 201 may calculate in the calculation processing the importance 406 of the attack detection rule based on whether or not each event of a plurality of events is a cause selected from among a plurality of causes.

Thereby, for example, the less the number of the logical symbols of sum 100B from a top event (for example, threat X) to an event corresponding to the attack detection rule is, the higher the importance 406 is. Therefore, it is possible to facilitate calculation of the importance 406.

(4) Moreover, in the above (2), the monitor 201 may determine in the determination processing the active scheme as the collection scheme 408 of the log according a rule in a case where the importance 406 of the attack detection rule is second importance higher than first importance that is not predetermined or not the highest (steps S1305 and S1308).

This allows the monitor 201 to determine the active scheme as the collection scheme 408, as the attack detection rule of the importance 406 that is considered as high according to absolute or relative evaluation is provided.

(5) Further, in (4) mentioned above, the attack detection rule has a risk value 402 that indicates a risk due to a threat, and in the determination processing, the monitor 201 may determine the active scheme as the collection scheme 408 according to the attack detection rule in a case where the risk value 402 is a second risk value higher than a first risk value 402 that is not predetermined or not the highest (steps S1101, S1305, and S1308).

This makes it possible to determine the active scheme as the collection scheme 408, as the attack detection rule of the risk value 402 that is considered as high according to absolute or relative evaluation and the importance 406 that is considered as high according to absolute or relative evaluation.

(6) Moreover, in the above (1), the monitor 201 executes, for each of a plurality of events, calculation processing by the calculation module 312 for calculating the detection cost 407 to detect an attack on the IoT device 110 based on a communication cost necessary for collecting a log from the IoT device 110 applied with the attack detection rule and the number of the IoT devices 110, and in the determination processing, the monitor 201 may determine either the passive scheme or the active scheme as the collection scheme 408 of the log according to the attack detection rule based on the detection cost 407 calculated in the calculation processing.

Thereby, it is possible to use the detection cost 407 for an attack so as to determine the collection scheme 408 with the emphasis on the detection cost 407. Accordingly, a log collected from the IoT device 110 is sorted into a log actively collected in the event of collection of logs all the time as before in consideration of the detection cost 407, thereby making it possible to reduce the amount of collection of logs while reducing a communication cost.

(7) Further, in the above (6), the monitor 201 may determine in the determination processing the active scheme as the collection scheme 408 of the log according an attack determination rule in a case where the detection cost 407 is a second detection cost smaller than a first detection cost that is not predetermined or not the smallest (step S1301).

This allows the monitor 201 to determine the passive scheme as the collection scheme 408, as the attack detection rule of the detection cost 407 that is considered as low according to absolute or relative evaluation is provided.

(8) Furthermore, in (6) mentioned above, the monitor 201 may determine in the determination processing either the passive scheme or the active scheme as the collection scheme 408 of the log according to the attack detection rule based on the sum (total detection cost) of the detection cost 407 of the attack detection rule and the detection cost 407 of the other rule determined as the passive scheme prior to the attack detection rule (step S1307).

Thereby, the collection scheme 408 tends to be determined to the passive scheme as the attack detection rule of a low detection cost 407 is provided.

(9) Further, in the above (8), the monitor 201 may determine in the determination processing the passive scheme as the collection scheme 408 of the log according to the attack detection rule in a case where the sum (total detection cost) is not equal to or larger than an actually usable communication cost, and determine the active scheme as the collection scheme 408 of the log according the attack detection rule in a case where such the sum is equal to or larger than the actually usable communication cost.

Thereby, the collection scheme 408 tends to be determined to the passive scheme as the attack detection rule of a low detection cost 407 is provided, without exceeding the actually usable communication cost.

(10) Moreover, in the above (1), the monitor 201 executes: first generation processing by the first generation module 315 for generating a first alert relating to a specific threat corresponding to a first rule determined as a passive scheme; specifying processing for specifying by the specifying module, with reference to the sequence DB 104, another IoT device 110 from which a second rule other than the first rule is detected from among specific time-series attack detection rules defining a specific threat corresponding to the first rule, in a case where the first alert is generated in the first generation processing; second generation processing by the second generation module 317 for generating a second alert relating to a specific threat corresponding to the second rule based on a log from the another IoT device 110 in a case where a collection request of the log from the another IoT device 110 is transmitted to the another IoT device 110 specified in the specifying processing, resulting in collection of a log from the another IoT device 110; and detection processing by the detection module 318 for detecting the specific threat defined according to the specific time-series attack detection rule based on the number of attack detection rules based on which the first alert and the second alert of the specific time-series attack detection rules are generated in a case where the second alert is generated in the second generation processing.

This makes it possible to detect with a high degree of accuracy what threat occurs or is predicted to occur in which IoT device 110.

(11) Further, in the above (10), the monitor 201 specifies in the specifying processing a target log for a collection request based on anteroposterior relation of the first rule and the second rule in the specific time-series rules, and the monitor 201 may generate in the second generation processing the second alert based on the target log from the another IoT device 110 in a case where the collection request of the target log from the another IoT device 110 is transmitted to the another IoT device 110 so that the target log from the another IoT device 110 is collected.

It is possible to specify an occasional collecting range of logs from the IoT device 110 as an attacked object to collect a log usable for detecting an attack.

(12) Further, in (11) mentioned above, the monitor 201 may determine in the specifying processing a log during a past certain period from now as a target log in a case where the second rule is defined prior to the first rule in the specific time-series attack detection rules, and determine a log up to a certain time from now as the target log in a case where the second rule is defined after the first rule in the specific time-series attack detection rules.

This makes it possible to easily specify a collection range of logs from anteroposterior relation of the first rule and the second rule.

(13) Furthermore, in (10) mentioned above, the monitor 201 is accessible to the score DB 105 as weight information associating the threat ID 401, the score 702 that is a weight of each attack detection rule constituting time-series attack detection rules, and a judgement threshold value 701 for judging an occurrence of a threat, and in the detection processing, the monitor 201 may determine, with reference to the score DB 105, a specific threat in a case where the sum of weights of rules based on which the first alert and the second alert are generated is equal to or larger than the judgment threshold value 701.

It is possible to use the score DB 105 so as to detect a threat as an attack on the IoT device 110 with an objective evaluation index, while enhancing detection accuracy of a threat.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A monitor for monitoring a plurality of monitored devices configured to record events in respective corresponding logs, wherein a number of the plurality of monitored devices operate in accordance with a passive log collection scheme, and a number of monitored devices operate in accordance with an active log collection scheme, the monitor comprising:
   a processor;
   a communication interface communicatively coupling the processor to each of the monitored devices; and
   a storage device configured to store one or more processor-executable programs which when executed by the processor cause the monitor to:
      analyze a log of a first monitored device operating in accordance with the passive log collection scheme by applying a plurality of attack detection rules comprising a first rule group defining a first monitored device threat;
      relate each of a plurality of events recorded in the log to at least one of a plurality of threat-causes, each of the threat-causes corresponding to one of the attack detection rules;
      relate each of the respective attack detection rules to the first monitored device threat by a respective corresponding number of logical combinations of the threat-causes;
      calculate for each of the attack detection rules in the first group, a respective corresponding first index value based the number of the corresponding logical combinations;
      to each of the attack detection rules in the first group, assign a corresponding respective log collection scheme indicator selected from the group comprising active log collection indicator and passive log collection indicator, based on the corresponding first index value;
      select an attack detection rule from the first group based at least in part on the corresponding first index value and at least in part on a second index value that indicates for each attack detection rule a corresponding risk due to the first threat;
   wherein,
      if the selected attack detection rule corresponds to an active log-collection scheme indicator, communicate with the first monitored device to cause the first monitored device to operate in accordance with the active log collection scheme, thereby decreasing the number of the plurality of monitored devices that operate in accordance with the passive log collection scheme;
      if the selected attack detection rule corresponds to a passive log-detection indicator, do not cause the first monitored device to operate in accordance with the active log collection scheme.

2. The monitor according to claim 1, wherein the processor is configured to:
   calculate for each respective threat-cause detection rule in the first group a detection cost to detect an attack on the first monitored device based on a communication cost for collecting the log from the first monitored device operating in accordance with the passive log collection scheme, and the number of the monitored devices operating in accordance with the passive log collection scheme, for each of the plurality of events, and wherein, the processor is configured to select the threat-cause detection rule from the group based at least in part on the corresponding calculated detection cost.

3. The monitor according to claim 2,
wherein the processor is configured to:
select a threat-cause detection rule corresponding to the active scheme where the detection cost for the active log collection scheme is smaller than a detection cost for the passive log collection scheme.

4. The monitor according to claim 2,
wherein, the processor is configured to select a threat-cause detection rule based at least in part on a sum of a detection cost of a first threat-cause detection rule and a detection cost of a second threat-cause detection rule.

5. The monitor according to claim 4,
wherein, the processor is configured to cause the first monitored device to operate in accordance with the passive log-collection scheme in a case where the sum is not equal to or larger than a threshold value, and operate in accordance with the active log collection scheme in a case where the sum is equal to or larger than the threshold value.

6. The monitor according to claim 1,
wherein the threat-cause detection rules comprise a time-series group defining the first threat according to a time-series rule, and wherein the processor is configured to:
generate a first alert relating to the first threat by applying to the log, first threat-cause detection rules indicated passive in the time-series group;
generate a second alert relating to the first threat by applying to a second log of a second monitored device operating in accordance with the active log collection scheme, second threat-cause detection rules indicated active in the time-specific group, in wherein the second log is collected in response to a collection request sent to the second device; and
detect the first threat based on the number of threat detection rules corresponding to the first alert and the number of threat detection rules corresponding to the second alert.

7. The monitor according to claim 6,
wherein the processor is configured to specify a target second log for the log collection request based on an anteroposterior relation of the first threat-detection rule and the second threat detection rule in the specific time-series group, and
wherein the processor is configured to generate the second alert based on the target second log collected from the second monitored device in response to the request.

8. The monitor according to claim 7,
wherein the processor is configured to determine a log during a past certain period from now as the target log in a case where the second threat-detection rule is defined prior to the first threat-detection rule in the time-series rules, and determine a log up to a certain time from now as the target log in a case where the second threat-detection rule is defined after the first threat-detection rule in the specific time-series rules.

9. The monitor according to claim 6,
wherein the monitor is accessible to weight information associating the first threat, a weight of each threat-detection rule constituting the time-series rules, and a judgement threshold value for judging an occurrence of the first threat, and
wherein the processor is configured to determine, with reference to the weight information, the first threat in a case where the sum of weights of threat-detection rules based on which the first alert and the second alert are generated is equal to or larger than the judgment threshold value.

10. A method of monitoring a plurality of monitored devices configured to record events in respective corresponding logs, wherein a number of the plurality of monitored devices operate in accordance with a passive log collection scheme, and a number of monitored devices operate in accordance with an active log collection scheme,
wherein the method is performed by a monitor including a processor configured to execute a program, a storage device configured to store the program, and a communication interface communicatively coupling the processor to each of the monitored devices, wherein the stored program configures the processor to perform the method comprising:
analyzing a log of a first monitored device operating in accordance with the passive log collection scheme by applying a plurality of attack detection rules comprising a first rule group defining a first monitored device threat;
relating each of a plurality of events recorded in the log to at least one of a plurality of threat-causes, each of the threat-causes corresponding to one of the attack detection rules;
relating each of the respective attack detection rules to the first monitored device threat by a respective corresponding number of logical combinations of the threat-causes;
calculating for each of the attack detection rules in the first group, a respective corresponding first index value based the number of the corresponding logical combinations;
to each of the attack detection rules in the first group, assigning a corresponding respective log collection scheme indicator selected from the group comprising active log collection indicator and passive log collection indicator, based on the corresponding first index value;
selecting an attack detection rule from the first group based at least in part on the corresponding first index value and at least in part on a second index value that indicates for each rule a risk due to the first threat; and
if the selected attack detection rule corresponds to an active log-collection scheme indicator, communicate with the first monitored device to cause the first monitored device to operate in accordance with the active log collection scheme, thereby decreasing the number of the plurality of monitored devices that operate in accordance with the passive log collection scheme; and
if the selected attack detection rule corresponds to a passive log-detection indicator, do not cause the first monitored device to operate in accordance with the active log collection scheme.

11. A non-transitory recording medium readable to a processor having a monitoring program recorded thereupon that causes the processor to monitor a plurality of monitored devices configured to record events in respective corresponding logs, wherein a number of the plurality of monitored devices operate in accordance with a passive log collection scheme, and a number of monitored devices operate in accordance with an active log collection scheme, by steps of:
analyzing a log of a first monitored device operating in accordance with the passive log collection scheme by applying a plurality of attack detection rules comprising a first rule group defining a first monitored device threat;

relating each of a plurality of events recorded in the log to at least one of a plurality of threat-causes, each of the threat-causes corresponding to one of the attack detection rules;

relating each of the respective attack detection rules to the first monitored device threat by a respective corresponding number of logical combinations of the threat-causes;

calculating for each of the attack detection rules in the first group, a respective corresponding first index value based the number of the corresponding logical combinations;

to each of the attack detection rules in the first group, assigning a corresponding respective log collection scheme indicator selected from the group comprising active log collection indicator and passive log collection indicator, based on the corresponding first index value;

selecting an attack detection rule from the first group based at least in part on the corresponding first index value and at least in part on a second index value that indicates for each rule a risk due to the first threat; wherein, if the selected attack detection rule corresponds to an active log-collection scheme indicator, communicate with the first monitored device to cause the first monitored device to operate in accordance with the active log collection scheme, thereby decreasing the number of the plurality of monitored devices that operate in accordance with the passive log collection scheme;

if the selected attack detection rule corresponds to a passive log-detection indicator, do not cause the first monitored device to operate in accordance with the active log collection scheme.

* * * * *